3,335,715
FIBER OPTIC CATHETER
Paul G. Hugenholtz, Weston, Michael L. Polanyi, Webster, and Robert E. Innis, Southbridge, Mass., assignors to American Optical Company, Southbridge, Mass., a voluntary association of Massachusetts
Filed Sept. 18, 1964, Ser. No. 397,540
6 Claims. (Cl. 128—2)

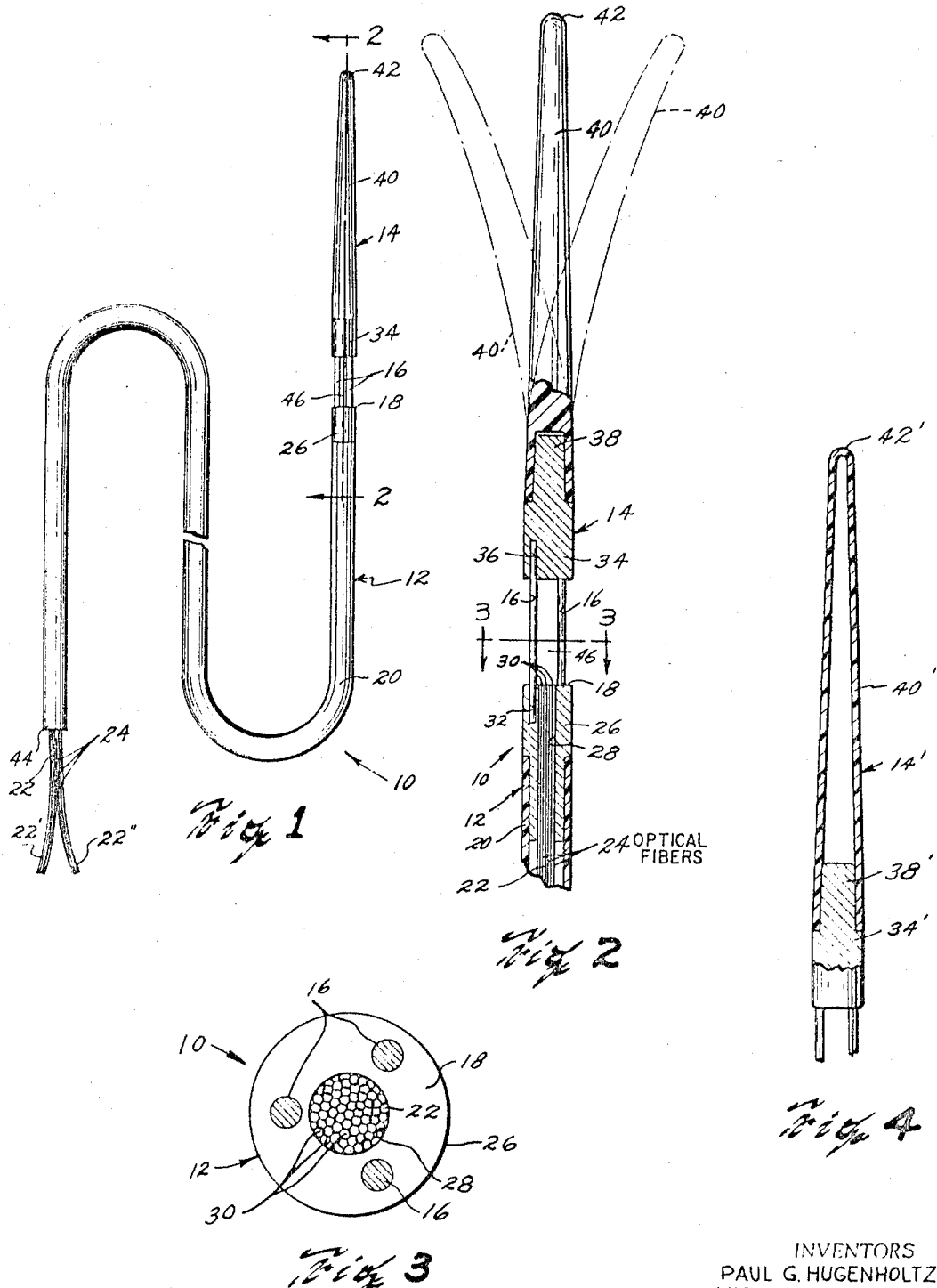
Aug. 15, 1967  P. G. HUGENHOLTZ ET AL  3,335,715
FIBER OPTIC CATHETER
Filed Sept. 18, 1964
INVENTORS
PAUL G. HUGENHOLTZ
MICHAEL L. POLANYI
ROBERT E. INNIS
BY
ATTORNEY United States Patent Office 3,335,715
Patented Aug. 15, 1967

This invention relates to flexible fiber optics devices and more particularly to improvements in fiber optical devices used for determining oxygen saturation of blood in-vivo.

Developments in the field of fiber optics have made possible immediate determinations of intravascular and intracardiac blood oxygen saturation by catheterization. A catheter containing a bundle of flexible light-conducting fibers having their one ends all exposed adjacent its distal end is inserted into the cardiovascular system to position the exposed ends of the fibers at a location in the system where intravascular or intracardiac determinations of oxygen saturation are required. Rapidly alternating pulses of near monochromatic 660 micron and 805 micron light are supplied to proximal ends of a number of efferent fibers in the bundle which emit this light into the blood. Efferent fibers in the bundle then carry light reflected from the blood to a photocell and output of the photocell is fed to electrical rationing means which gives a reading directly proportional to oxygen saturation. Such apparatus has been disclosed in U.S. Patents Nos. 3,068,739 and No. 3,068,742 assigned to the assignee of the present application.

It has been found that significant errors in saturation determination can occur when ends of fibers in the fiber optic bundle come into contact or into very close relationship with the endocardium or vessel walls. In order to avoid these artifacts, protective cages formed of wires have been provided on the distal ends of the catheters. These end protectors, however, have been found to constitute a serious hazard to the patient under certain conditions, especially when the catheter is in the ventricle. Dangerous irritation and arrhythmia, induced by metallic end protectors has been observed in several patients during cardiac catheterizations.

It is an object of the present invention to provide for fiber optical catheterization of the cardiovascular system with a minimum of hazard to the patient.

A more specific object of the present invention is to provide for cardiac catherization without inducing dangerous irritation of vascular or cardiac tissues or undue arrhythmia.

A further object is the provision of a fiber optic catheter which is applicable to routine cardiac catheterizations.

To attain the aforesaid objects, and others which may appear from the following detailed description, in accordance with one aspect of the present invention, we provide a catheter of a diameter and length suitable for introduction into passages of the cardiovascular system. Contained within the catheter is a bundle of flexible light-conducting fibers having all their one ends exposed adjacent the distal end of the catheter.

Beyond such exposed ends of the fibers and spaced a substantial distance therefrom by a number of supporting pins is a long and thin highly flexible non-metallic extension having a blunt smoothly rounded leading end. The extension, normally being coaxially aligned with the catheter proper but being freely flexible in all lateral directions throughout the major portion of its length, functions as a leader for the catheter proper during its insertion into and through passages of the cardiovascular system. In this way, the exposed ends of the optical fibers are caused to follow directly behind the extension at all times and are thus prevented from contacting the walls of the passages or ventricles into which the catheter is inserted. Once the end of the catheter has reached its intended location, the flexible tip prevents harmful contact of the metallic end of the catheter with the walls of the vessel or organ into which it is inserted.

The supporting pins which span the space provided between the exposed fiber ends and the butt section of the catheter extension are formed of rigid or at least relatively inflexible material so as to not only maintain an aligned relationship of the extension and catheter proper at all times but to maintain a desired spacing between the extension and fiber ends. Thus, when blood measurements are being taken, blood will flow freely through this spacing and across the exposed ends of the fibers. In order to avoid undue obstruction of the spacing, a minimum number of supporting pins, preferably three, is used and each pin is of a minimum size required for security of structure.

The present invention will be more fully understood by reference to the following detailed description which is accompanied by a drawing in which FIG. 1 illustrates in elevation an embodiment of the present invention;

FIG. 2 is a greatly enlarged longitudinal cross-sectional view of the improved catheter of our invention taken generally along line 2—2 of FIG. 1;

FIG. 3 illustrates a cross-sectional view of the catheter taken transversely thereof along line 3—3 of FIG. 2; and FIG. 4 illustrates a modification of the invention.

Referring now to FIG. 1 there is shown catheter 10 having a main body portion 12 and extension 14. Extension 14 is supported in spaced forwardly disposed aligned relationship with distal end 18 of body portion 12 by a number of pins 16.

As shown in more detail in FIG. 2, body portion 12 of catheter 10 comprises an outer flexible sheath 20 and bundle 22 of fibers 24 contained therewithin. The distal end of sheath 20 is hermetically sealed to shouldered end fitting 26 inserted therein and cemented or otherwise fixed in place. End fitting 26 is provided with axially disposed opening 28 adapted to snugly receive bundle 22 of fibers 24. Fibers 24 are extended through opening 28 and are all cemented, fused or otherwise hermetically sealed together and to fitting 26. The aligned exposed ends 30 of fibers 24 (see FIGS. 2 and 3) are, along with adjoining edges of fitting 26, all ground and polished to a plane surface.

Corresponding one ends of pins 16 are deeply seated and cemented, fused, welded or otherwise secured in receiving openings 32 provided therefor in fitting 26 (see FIG. 2 where one such opening is illustrated).

Extension 14 comprises butt 34 having longitudinally disposed openings 36 therein adapted to mate with the opposite ends of pins 16. These ends of pins 16 are deeply seated in openings 36 which are similar to openings 32 and are cemented, fused, welded or otherwise secured in place therein. Butt 34 of extension 14 is provided with tang 38 upon which tip 40 is tightly fitted and cemented or otherwise secured in place (see FIG. 2). In the embodiment of the invention illustrated in FIGS. 1 and 2, tip 40 is formed of a relatively soft and pliable but generally shape retaining rubber, plastic or similar material adapted to flex freely in all lateral directions substantially as shown by broken line illustration in FIG. 2 where flexing in one plane only is depicted.

In its presently preferred form, tip 40 is relatively long and thin, of a maximum diameter approximately equal to that of the catheter body portion 12 and is uniformly tapered slightly inwardly toward a relatively blunt, well rounded and smoothly finished terminal end 42. Although it is not shown in the drawing, the invention also contemplates the provision of a tip which is not tapered but is of substantially uniform dimension throughout the major portion of its length with a well rounded terminal end similar to end 42 of tip 40.

The adjoining outer edges of tip 40 and butt 34 and of fitting 26 and sleeve 12 are tightly fitted together in flush relationship with each other to provide a smooth effectively continuous adjoinment thereof and all exposed surfaces of fitting 26, pins 16 and butt 34 of extension 14 are smoothly finished.

The light-conducting fibers 24 shown in FIGS. 1, 2 and 3 each comprise a flexible core formed of optical glass or of a suitable plastic material having a relatively high refractive index which is coated with a thin layer of a transparent plastic or glass having a lower refractive index than the core material. Thus, light entering each of the cores of the fibers will be conducted by internal reflection from one end of the fiber to the other.

Adjacent the proximal end 44 of catheter 10 (see FIG. 1), bundle 22 of fibers 24 is divided with respective fibers 24 thereof formed into separate groups 22' and 22". One group of the fibers is used for conducting light from the proximal end of catheter 10 into space 46 behind extension 14 and corresponding fibers of the other group are used to receive and transmit light reversely through catheter 10 to its proximal end 44.

Since it forms no part of the present invention, apparatus for directing light into afferent fibers and for receiving light from efferent fibers of bundle 22 is not shown herein. However, it will be appreciated that, according to principles of this invention, extension 14 of catheter 10 functions to lead distal end 18 of the catheter proper during insertion of the catheter into the cardiovascular system and, in so doing, extension 14 prevents ends 30 of all fibers 24 from coming into contact with the vascular walls or the endocardium. Space 46 between distal end 18 of the catheter body portion 12 and extension 14 permits a free flow of blood across ends 30 of fibers 24 at all times during catheterization and the soft, pliable, smooth surfaced non-metallic tip 40 of extension 14 prevents harsh contact of the catheter with vascular or cardiac tissues thereby avoiding harmful irritation of such tissues.

According to the principles set out above, a typical catheter would be one meter or more in length, have an outer diameter of approximately 2 millimeters with an extension 14 of approximately from 20 to 30 millimeters in length and spaced by pins 16 approximately 4 millimeters from ends 30 of fibers 24. With fitting 26, pins 16 and butt 34 of extension 14 formed of stainless steel, three pins 16 each measuring approximately one millimeter in diameter and being radially disposed at 120° intervals substantially as illustrated in FIG. 3 have been found to provide adequate support for extension 14 without being unduly restrictive to the passage of blood through spacing 46.

It should be understood, however, that the present invention is not limited to the particular size of catheter or other dimensions thereof given hereinabove nor is the invention limited to the use of any of the above-mentioned materials. For some applications, it might be desirable to form the fitting 26, pins 16 and butt 34 of extension 14 of metals other than stainless steel or of a rigid non-metallic material such as, for example, Teflon or nylon.

Referring to FIG. 4 wherein a modification of the invention is illustrated, there is shown catheter extension 14' having flexible tip 40' secured to tang 38' of butt 34'. In this embodiment of the invention, tip 40' is hollow with its terminal end 42' closed. Tip 40' may be formed of molded or extruded relatively soft rubber or plastic or formed of woven nylon or Teflon impregnated or externally coated with a suitable plastic sealing medium. Tip 40' may, for added support thereof, be filled with a foamed rubber or plastic or even a liquid if desired.

We claim:
1. A fiber optic catheter including a substantial length of a multiplicity of flexible light-conducting fibers bundled together in side-by-side relationship with each other within a sheath of flexible material wherein the improvement comprises:
  a fitting secured to one end of said sheath, said fitting having an opening therein through which said bundle of fibers is extended with one of its ends exposed as a light emitting and receiving face;
  spacer means extending from said fitting adjacent the perimeter of said face to a point remote therefrom;
  an extension including a long and thin tip of pliable material having one of its ends fixed to said spacer means adjacent said remote point with the major portion of its length being free to flex laterally in all directions for guiding said catheter longitudinally through serpentine and other passages when inserted thereinto.

2. A fiber optic catheter as recited in claim 1 wherein said spacer means comprises a number of pins which are rigidly interconnected adjacent said remote point.

3. A fiber optic catheter as recited in claim 1 wherein said long and thin tip is tapered inwardly throughout the major portion of its length from adjacent said one end thereof toward its opposite distal end and said distal end is blunted with a smoothly rounded contour shape.

4. A fiber optic catheter as recited in claim 1 wherein said long and thin tip has a hermetically sealed hollow interior.

5. A fiber optic catheter as recited in claim 4 wherein said hollow interior is at least partially filled with a pliant supporting medium.

6. A fiber optic catheter as recited in claim 2 wherein said pins are of minimum number and cross-sectional size commensurate with high resistance to bending during use of the catheter and minimum obstruction to the flow of blood and other fluids across said face of said bundle of fibers.

References Cited

UNITED STATES PATENTS

| | | |
|---|---|---|
| 3,068,739 | 12/1962 | Hicks et al. |
| 3,131,690 | 5/1964 | Innis et al. _____ 128—23 |
| 3,261,356 | 7/1966 | Wallace _____ 128—276 |
| 3,267,932 | 8/1966 | Valiere _____ 128—2.05 |

RICHARD A. GAUDET, *Primary Examiner.*

SIMON BRODER, *Examiner.*

UNITED STATES PATENT OFFICE
CERTIFICATE OF CORRECTION

Patent No. 3,335,715                                            August 15, 1967

Paul G. Hugenholtz et al.

It is hereby certified that error appears in the above numbered patent requiring correction and that the said Letters Patent should read as corrected below.

Column 1, line 24, for "efferent" read -- afferent --; line 28, for "rationing" read -- ratioing --; line 49, for "catherization" read -- catheterization --.

Signed and sealed this 12th day of November 1968.

(SEAL)
Attest:

Edward M. Fletcher, Jr.                              EDWARD J. BRENNER
Attesting Officer                                           Commissioner of Patents